(12) United States Patent
Mo et al.

(10) Patent No.: US 7,151,773 B1
(45) Date of Patent: Dec. 19, 2006

(54) SYSTEM AND METHOD FOR CONNECTIONLESS/CONNECTION ORIENTED SIGNAL TRANSPORT

(75) Inventors: Li Mo, Plano, TX (US); Edward T. Sullivan, Highland Village, TX (US); George E. Bucklin, McKinney, TX (US); David W. Wynn, Garland, TX (US)

(73) Assignee: Fujitsu Limited, Kawasaki (JP)

( * ) Notice: Subject to any disclaimer, the term of this patent is extended or adjusted under 35 U.S.C. 154(b) by 897 days.

(21) Appl. No.: 09/588,632

(22) Filed: Jun. 6, 2000

Related U.S. Application Data

(60) Provisional application No. 60/202,190, filed on May 5, 2000.

(51) Int. Cl.
*H04L 12/56* (2006.01)
(52) U.S. Cl. ...................... 370/392; 370/465
(58) Field of Classification Search ............... 370/352, 370/353, 389, 392, 400, 401, 465, 395.5
See application file for complete search history.

(56) References Cited

U.S. PATENT DOCUMENTS

| | | | |
|---|---|---|---|
| 5,229,990 A | 7/1993 | Teraslinna | 370/60 |
| 5,231,633 A | 7/1993 | Hluchyj et al. | 370/94.1 |
| 5,461,624 A | 10/1995 | Mazzola | 370/85.13 |
| 5,590,133 A | 12/1996 | Billsröm et al. | 370/349 |
| 5,771,370 A | 6/1998 | Klein | 395/500 |
| 5,781,534 A | 7/1998 | Perlman et al. | 370/248 |
| 5,818,842 A | 10/1998 | Burwell et al. | 370/397 |
| 5,825,772 A | 10/1998 | Dobbins et al. | 370/396 |
| 5,850,399 A | 12/1998 | Ganmukhi et al. | 370/412 |
| 5,852,606 A | 12/1998 | Prince et al. | 370/393 |
| 5,946,308 A | 8/1999 | Dobbins et al. | 370/392 |
| 5,956,341 A | 9/1999 | Galand et al. | 370/412 |
| 5,991,300 A * | 11/1999 | Tappan | 370/392 |
| 6,016,319 A * | 1/2000 | Kshirsagar et al. | 370/410 |
| 6,018,766 A | 1/2000 | Samuel et al. | 709/218 |
| 6,028,842 A | 2/2000 | Chapman et al. | 370/235 |
| 6,055,561 A * | 4/2000 | Feldman et al. | 709/200 |
| 6,058,113 A | 5/2000 | Chang | 370/390 |
| 6,075,767 A | 6/2000 | Sakamoto et al. | 370/228 |
| 6,169,739 B1 * | 1/2001 | Isoyama | 370/395.54 |
| 6,205,158 B1 | 3/2001 | Martin et al. | 370/541 |
| 6,317,426 B1 | 11/2001 | Afanador et al. | 370/352 |
| 6,331,905 B1 | 12/2001 | Ellinas et al. | 359/110 |

(Continued)

FOREIGN PATENT DOCUMENTS

EP 364955 A2 * 4/1990

(Continued)

OTHER PUBLICATIONS

Rekhter, Y. et al. "Cisco Systems—Tag Switching Architecture Overview". draft-rfced-info-rekhter-00.txt. Sep. 1996, pp. 1-13.*

(Continued)

*Primary Examiner*—Ricky Q. Ngo
*Assistant Examiner*—Donald L Mills
(74) *Attorney, Agent, or Firm*—Baker Botts L.L.P.

(57) ABSTRACT

A method of communicating connectionless and connection oriented signals using at least one common network element includes receiving connectionless and connection oriented signals from a plurality of source peripheral network elements and determining a signaling type associated with each signal, the signaling type comprising connectionless signaling or connection oriented signaling. The method further includes appending a transport label to each signal, each transport label comprising an indication of the signal's signaling type, and communicating the signals and appended transport labels toward destination peripheral network elements according to signaling procedures associated with each signal's signaling type.

27 Claims, 7 Drawing Sheets

U.S. PATENT DOCUMENTS

| | | | |
|---|---|---|---|
| 6,353,593 B1 | 3/2002 | Chen et al. | 370/216 |
| 6,353,616 B1 | 3/2002 | Elwalid et al. | 370/443 |
| 6,359,857 B1 | 3/2002 | Ahmad et al. | 370/217 |
| 6,366,556 B1 | 4/2002 | Ballintine et al. | 370/216 |
| 6,374,303 B1* | 4/2002 | Armitage et al. | 709/242 |
| 6,385,193 B1* | 5/2002 | Civanlar et al. | 370/352 |
| 6,526,056 B1* | 2/2003 | Rekhter et al. | 370/392 |
| 6,628,617 B1* | 9/2003 | Karol et al. | 370/237 |
| 6,628,649 B1* | 9/2003 | Raj et al. | 370/360 |
| 6,680,933 B1* | 1/2004 | Cheesman et al. | 370/352 |
| 2001/0012295 A1* | 8/2001 | Wilford | 370/392 |
| 2001/0025310 A1 | 9/2001 | Krishnamurthy et al. | 709/223 |
| 2003/0088699 A1* | 5/2003 | Luciani et al. | 709/243 |

FOREIGN PATENT DOCUMENTS

| | | |
|---|---|---|
| EP | 0 512 495 A2 | 11/1992 |
| EP | 0 849 970 A2 | 6/1998 |
| EP | 896494 A2 * | 2/1999 |
| EP | 0 959 641 A1 | 11/1999 |
| WO | WO 97/40610 | 10/1997 |
| WO | WO 98/00954 | 1/1998 |
| WO | WO 99/11090 | 3/1999 |
| WO | WO 99/66675 | 12/1999 |
| WO | WO 00/10357 | 2/2000 |
| WO | WO 00/21254 | 4/2000 |
| WO | WO 00/24164 | 4/2000 |

OTHER PUBLICATIONS

Zhigang, J. et al. "Supporting Differentiated Service in MPLS-based ATM Switches". Fifth Asia-Pacific Conference on Communications and Fourth Optoelectronics and Communications Conference, APCC/OECC 1999. Oct. 18-22, 1999. vol. 1. pp. 91-93.*

International Search Report in International Application No. PCT/US 01/13723, dated Oct. 31, 2000, 7 pages.

International Search Report in International Application No. PCT/US 01/13725, dated Oct. 31, 2001, 6 pages.

International Search Report in International Application No. PCT/US 01/14624, dated Nov. 6, 2001, 6 pages, Nov. 11, 2001.

PCT Invitation to Pay Additional Fees in International Application No. PCT/US 01/13732, dated Nov. 7, 2001, 4 pages.

Tsong-Ho Wu, "A Passive Protected Self-Healing Mesh Network Architecture and Applications," XP 000446089, *IEEE/ACM Transactions on Networking*, Feb. 1994, 13 pages.

Form PCT/IPEA/416, *Notification of Transmittal of International Preliminary Examination Report*, with attached Form PCT/IPEA/409, *PCT International Preliminary Examination Report* (5 pages), for PCT/US01/13694 dated Mar. 19, 2003.

PCT International Search Report in International Application No. PCT/US 01/13695, dated Oct. 9, 2001, 6 pages.

PCT International Search Report No. PCT/US01/13724, dated Nov. 30, 2001, 6 pages.

Birman A et al.: "Support for RSVP-Based Services Over ATM Networks," Communications: The Key to Global Prosperity. Globecom 1996. Global Internet 96 Conference Record. London, Nov. 18-22, 1996, Global Telecommunications Conference (Globecom, New York, IEEE, US, vol. SUPP, 18, Nov. 1996 pp. 10-15, XP000741665 ISBN: 0-7803-3337-3.

Sharma et al.: "Scalable timers for soft state protocols," Infocom '97. Sixteenth Annual Joint Conference of the IEEE Computer and Communications Societies. Driving the Information Revolution., Proceedings IEEE Kobe, Japan Apr. 7-11, 1997, Los Alamitos, CA USA, IEEE Comptu. Soc, US Apr. 7, 1997, pp. 222-229, XP010252006, ISBN: 08-8186-7780-5.

International Search Report in International Application. No. PCT/US01/14626, dated Feb. 5, 2002, 7 pages.

International Search Report in International Application No. PCT/US01/14622, dated Feb. 14, 2002, 7 pages.

Pancha P: "ATM Switch Routers for Combined Connection-Oriented and Connectionless Transport," ISS '97. World Telecommunications Congress. (Int'l Switching Symposium). Global Network Evolution: Convergence or Collision? Toronto, Sep. 21-26, 1997, ISS. World Telecommunications Congress. (International Switching Symposium).

Mysore J. P. et al.: "Performance of transport protocols over a multicasting-based architecture fr Internet host mobility" Communications, 1998. ICC 98. Conference Record. 1998 IEEE International Conference on Atlanta, GA, USA Jun. 7-11, 1998, New York, NY USA, IEEE, US, Jun. 7, 1998, pp. 1817-1823, XP010284635, ISBN: 0-7803-4788-9, Nov. 1998.

Bar-Noy A. et al.: "Topology Distribution Cost Vs. Efficient Routing in Large Networks," Computer Communications Review, Association for Computing Machinery, New York, US, vol. 20, No. 4, Sep. 1, 1990, pp. 242-252, XP000168058; ISSN: 0146-4833, whole document.

International Search Report in International Application No. PCT/US01/13694, dated Mar. 12, 2002, 7 pgs.

Fritz J: "Bullet Proofing ATM: Part I," Byte, McGraw-Hill Inc. St. Peterborough, US, vol. 22, No. 6, Jun. 1, 1997, pp. 59-60, XP000691556, ISSN: 0360-5280, p. 60.

Sun H. et al.: "Supporting IP on the ATM networks: an overview," Computer Communications, Elsevier Science Publishers BV, Amsterdam, NL, vol. 21, No. 11, Aug. 10, 1998, pp. 1020-1029, XP004138773, ISSN: 0140-3664, whole document.

Law A M et al: "Simulation Software for Communications Networks: The State of the Art," IEEE Communications Magazine, IEEE Service Center. Piscataway, N.J., US, vol. 32, No. 3, Mar. 1, 1994, p. 1, col. 2, line 4-p.2 , col. 1, line 39, p. 4, col. 1, line 3-p. 6, col. 1, paragraph 6; XP 000442186.

International Search Report in International Application No. PCT/US01/14615, dated Apr. 5, 2002, 7 pages.

International Preliminary Examination Report in International Application No. PCT/US01/13725, dated Jun. 4, 2002, 5 pages.

International Preliminary Examination Report in International Application No. PCT/US01/13695, dated Oct. 30, 2002, 4 pages.

* cited by examiner

| 310a | 0000 | MPLS LABEL |
|---|---|---|
| 310b | 0001 | MULTICAST LABEL |
| 310c | 0010 | CORE MOTHERFACE LABEL WITH SOURCE INFO |
| 310d | 0011 | CORE INTERFACE LABEL WITHOUT SOURCE INFO |
| | 0100 | RESERVED |
| | 0101 | RESERVED |
| | 0110 | H/W |
| | 0111 | RESERVED |
| | 1000 | RESERVED |
| | 1001 | RESERVED |
| | 1010 | RESERVED |
| | 1011 | RESERVED |
| | 1100 | RESERVED |
| | 1101 | RESERVED |
| 310p | 1110 | CORE NODE ID LABEL |
| | 1111 | RESERVED |

SYSTEM AND METHOD FOR CONNECTIONLESS/CONNECTION ORIENTED SIGNAL TRANSPORT

RELATED APPLICATION

This application claims the benefit of U.S. Provisional Application Ser. No. 60/202,190, entitled Internet Protocol Transport, filed May 5, 2000, which is hereby incorporated by reference.

TECHNICAL FIELD OF THE INVENTION

The present invention relates to the field of communication systems, and more particularly to a system and method for communicating connectionless and/or connection oriented signals using one or more common network elements.

BACKGROUND OF THE INVENTION

Existing networks typically operate in one of two modes, connection oriented mode or connectionless mode. In a connection oriented mode of operation, signals are communicated over specified paths from a source network element to a destination network element. Multi-Protocol Label Switching (MPLS) signals with, for example, Asynchoronous Transport Mode (ATM), Frame Relay, or packet-over-SONET encoding are examples of connection oriented signals. In a connectionless mode of operation, signals are communicated with less regard for the particular path traversed between source and destination network elements. Connectionless signaling typically focuses on the destination address, or other identification, rather than any particular path between source and destination network elements. Internet Protocol (IP), IPx, and SNA packet switching are examples of connectionless signal transport.

Connection oriented and connectionless communication each have their virtues. Due to the tracking of per-connection information in a connection oriented network, the connection oriented network provides efficient bandwidth management, which enables quality of service (Qos) aware services and traffic engineering ability. Connectionless networks, while generally less capable of providing quality of service aware services and traffic engineering capabilities, provide advantages over connection oriented networks in terms of their simplicity, reliability, and scaleability.

For example, connectionless networks do not generally require per-connection maintenance constructions to ensure complete state restoration upon recovery from a node failure. Rather, recovery from a nodal failure in a connectionless network typically only involves resynchronizing the routing database. In terms of scaleability, the connectionless network elements need only track the other network elements in the network, while the connection oriented network elements generally track each flow between various network elements. Because more than one flow can exist between network elements, the scaleability of connection oriented networks is generally limited if the network is to properly track various flow information. The lack of scaleability of conventional connection oriented networks has generally limited their applicability to geographically limited networks.

These and other network differences have generally resulted in connection oriented signals being transported over one set of network elements, while connectionless signals are communicated using another set of network elements. As a result, conventional network architectures, particularly wide area architectures have not supported both connectionless and connection oriented signaling.

SUMMARY OF THE INVENTION

In accordance with the present invention, a method of communicating connectionless and connection oriented signals using at least one common network element comprises receiving connectionless and connection oriented signals from a plurality of source peripheral network elements and determining a signaling type associated with each signal, the signaling type comprising connectionless signaling or connection oriented signaling. The method further includes appending a transport label to each signal, each transport label comprising an indication of the signal's signaling type, and communicating the signals and appended transport labels toward destination peripheral network elements according to signaling procedures associated with each signal's signaling type.

Various embodiments of the present invention may exhibit some, none, or all of the following technical advantages. For example, the invention provides an architecture that captures the advantages of connectionless and connection oriented signaling in a single network. The invention provides the ability to perform traffic engineering and bandwidth management functions associated with connection oriented service, while facilitating a scalable, geographically diverse network topology, which is simple and reliable.

Other technical advantages are readily apparent to one of skill in the art from the attached figures, description, and claims.

BRIEF DESCRIPTION OF THE DRAWINGS

For a more complete understanding of the present invention, and for further features and advantages thereof, reference is now made to the following description taken in conjunction with the accompanying drawings, in which.

DETAILED DESCRIPTION OF THE INVENTION

Figure 1:
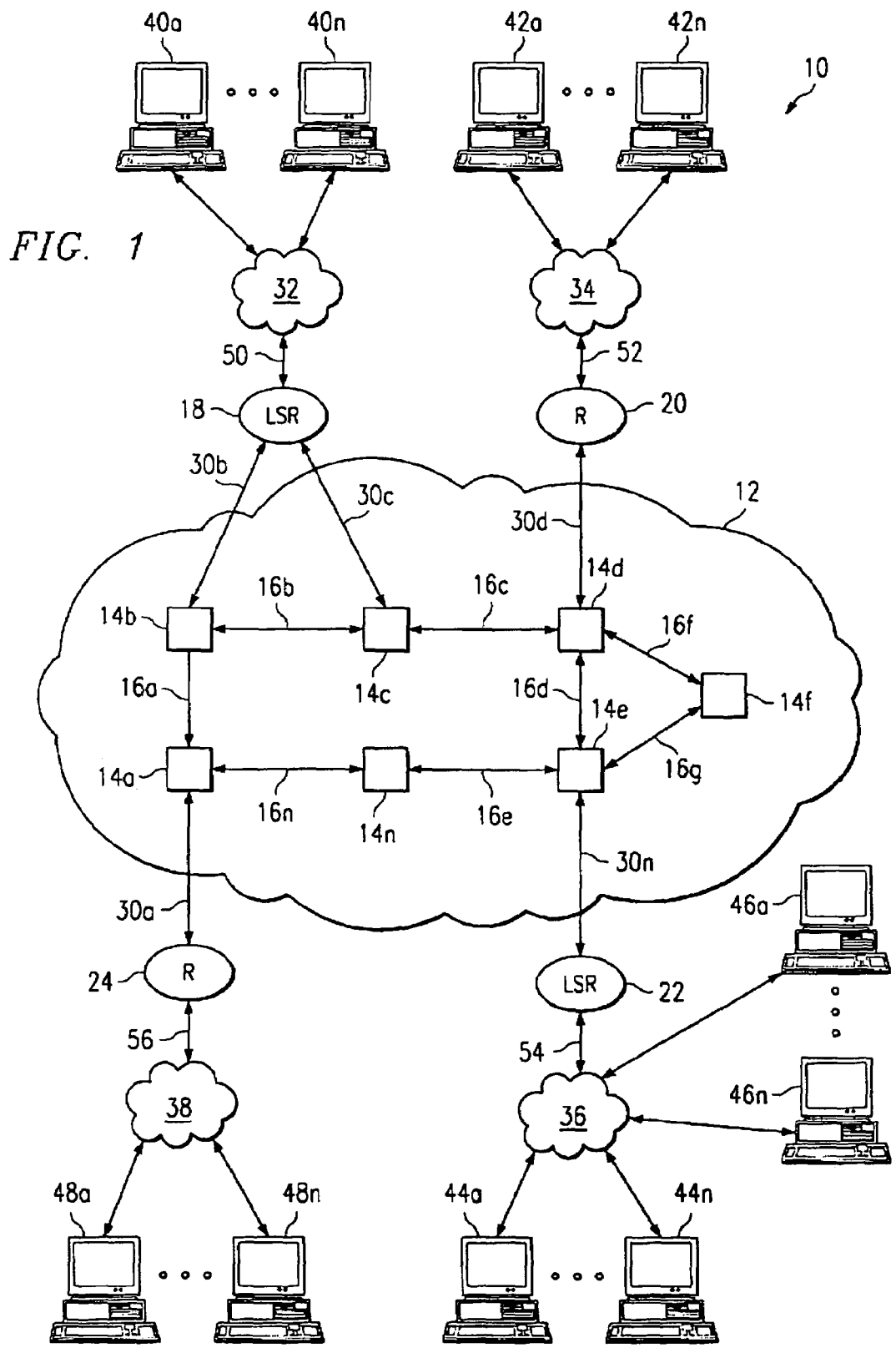
FIG. 1 is a block diagram of an exemplary system operable to facilitate communication of connection oriented signals and connectionless signals using common network elements.

FIG. 1 is a block diagram of an exemplary system 10 operable to facilitate communication of connection oriented signals and connectionless signals using common network elements. Throughout this description, the term "connection oriented signal" refers to a signal associated with a particular path, or portion of a path, from a source network element to a destination network element. In connection oriented signaling, the signal's path through the network elements is generally determined before the signal's payload traverses any of the network elements. Multi-Protocol Label Switching (MPLS) signals with ATM, Frame Relay, or Packet-over SONET encoding are examples of connection oriented signals.

Throughout this description, the term "connectionless signal" refers to a signal that is not necessarily associated with any particular path from a source network element to a destination network element. In connectionless signaling, routing determinations, such as determining the next network element in the path, are generally made at each node in the path, where each node independently identifies the next node in the forwarding chain. IP and IPx signals are examples of connectionless signals.

System 10 includes a core cloud 12 comprising one or more core network elements 14a–14n (referred to generally as "core network elements 14"). Core network elements 14 can communicate with one another via communication links 16a–16n, and with one or more peripheral network elements 18–24 via communication links 30a–30n. Communication links 16 and 30 may comprise any wireless, wireline, fiber, or other communication medium or combinations of media. Signals communicated via communication links 16 and/or 30 may be electrical, optical, or any combination thereof.

Peripheral network elements 18–24 facilitates communication between core cloud 12 and other network elements, and/or other networks, such as networks 32, 34, 36, and 38. In the illustrated embodiment, peripheral network elements 18–24 comprise routers. Peripheral network elements could also comprise other network elements, such as next-generation access devices. In the illustrated embodiment, peripheral network element 18 comprises a label switching router (LSR). Throughout this document, the term "label switching router" refers to hardware operable to route MPLS or other label-switched signals. Label switching router 18 couples to network 32 via a communication link 50. Similarly, label switching router 22 couples to network 36 via a communication link 54. Throughout this document, the term "couple" refers to a direct or indirect communication between two or more elements. Elements said to be "coupled" to one another may, but need not, be physically connected.

Label switching routers 18 and 22 facilitate routing functions for signals originated or forwarded by interface equipment 40a–40n and 44a–44n/46a–46n, respectively, and communicated over networks 32 and 36, respectively. Interface units 40, 44, and 46 may be, for example, personal computers, servers, switches, routers, or any other network equipment operable to originate and/or forward communication signals. In the illustrated embodiment, interface units 40, 44, and 46 operate to communicate MPLS or other label switched signals with ATM, Frame Relay, and/or packet-over-SONET encoding. Other interface units communicating other types of signals could also couple to networks 32 and 36 without departing from the scope of the invention.

In the illustrated embodiment, peripheral network elements 20 and 24 comprise routers (R) operable to route connectionless signals, such as Internet Protocol (IP) signals. Routers 20 and 24 facilitate routing functions for signals originated or forwarded by interface equipment 42a–42n and 48a–48n, respectively, and communicated over networks 34 and 38, respectively. Router 20 couples to network 34 via a communication link 52. Similarly, router 24 couples to network 38 via a communication link 56. Interface units 42 and 48 may be, for example, personal computers, servers, switches, routers, or any other network equipment operable to originate and/or forward communication signals to routers 20 and 24 through networks 34 and 38, respectively.

Networks 32, 34, 36, and 38 may comprise any suitable wireline or wireless system that supports communication between network elements using ground-based and/or space-based components. For example, networks 32–38 may be public switched telephone networks (PSTN), integrated services digital networks (ISDN), local area networks (LAN), metropolitan area networks (MAN), wide area networks (WAN), or other communication systems or combination of communication systems at one or more locations. Each of networks 32–38 may comprise a single network, or multiple separate networks. In addition, although for simplicity each network 32, 34, 36, and 38 has been shown as coupled to only one router, it should be understood that networks 32–38 could couple to or include any number of routers, switches, personal computers, servers, or other communication and/or computing devices.

In operation, core cloud 12 receives both connectionless and connection oriented signals from peripheral network elements 18–24, and routes those signals through core network 12 to another appropriate peripheral network element 18–24 according to routing procedures associated with the signal type received. In a particular embodiment, an ingress core network element 14 receives an incoming signal from a peripheral network element 18–24, which is bound for another peripheral network element 18–24. The ingress core network element 14 determines whether the signal is to be transported using connectionless or connection oriented signaling—or a combination of connectionless and connection oriented signaling—and appends a transport label to the incoming signal. The transport label identifies the type of signaling the incoming signal will experience as it traverses core cloud 12.

The ingress core network element 14 identifies an egress core network element 14 associated with a destination peripheral network element 18–24, and communicates the signal toward egress core network element 14. Depending on the type of signal, ingress core network element 14 may route the signal using connectionless routing, connection oriented routing, or a combination of the two. Core network elements 14 residing between the ingress core network element 14 and the egress core network element 14 receive the signal with an appended transport label, and process the signal in accordance with the transport label. The egress core network element 14, receives the signal and returns the signal to its original format by, for example, removing the appended transport label, and communicates the signal to the destination peripheral network element 18–24.

System 10 provides an architecture that captures the advantages of connectionless and connection oriented signaling in a single network. For example, system 10 provides the ability to perform traffic engineering and bandwidth management functions associated with connection oriented service. At the same time, using the same core network elements, system 10 facilitates a scalable, geographically diverse network topology, which is simple and reliable.

Figure 2:
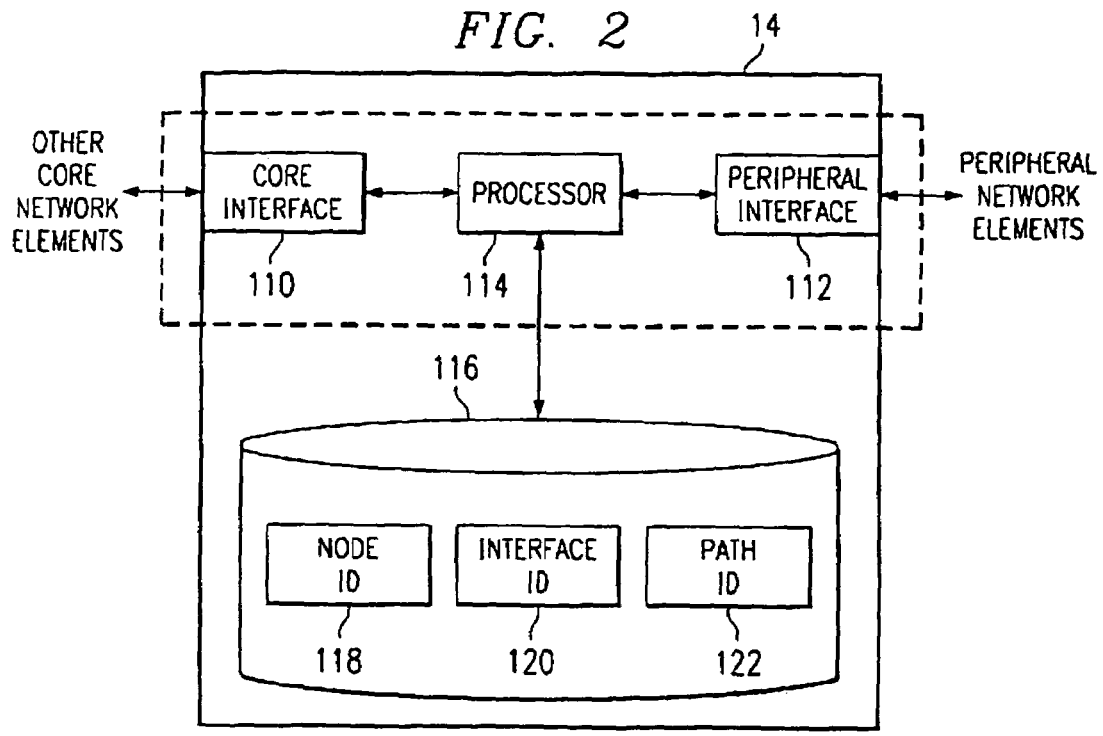
FIG. 2 is a block diagram of an exemplary network element constructed according to the teachings of the present invention.

FIG. 2 is a block diagram of an exemplary core network element 14 constructed according to the teachings of the present invention. Each core network element 14 includes a core interface 110 operable to facilitate communication between various core network elements 14. Core network elements 14 which communicate with one or more peripheral network elements 18–24 may also include a peripheral interface (periph. I/F) 112, operable to facilitate communication between a core network element 14 and one or more associated peripheral network elements 18–24. Core interface 110 and peripheral interface 112 include the appropriate hardware, software, and/or firmware to communicate using a direct connection to a PSTN or ISDN, a connection through a LAN, WAN, or global computer network such as the Internet, or any other suitable communication link that allows core network elements 14 to communicate with other core network elements 14 and/or peripheral network elements 18–24.

A processor 114 communicates with core interface 110 and peripheral interface 112. Throughout this document, the term "processor" refers to hardware, software, firmware, or any combination thereof in one or more locations operable to provide signal and/or data processing functionality. In the illustrated embodiment, processor 114 comprises a portion of an application-specific integrated circuit (ASIC) Other types of processors could be used.

Although the illustrated embodiment shows processor 114 and interfaces 110, 112 as separate entities, some or all of the functionality of either or both of interfaces 110 and 112 could be implemented in processor 114 without departing from the scope of the present invention. Processor 114 also communicates with a memory 116. Memory 116 may comprise any storage device or combination of storage devices accessible to processor 114. Memory 116 may comprise an integral part of core network element 14, or may reside remotely from and be accessible to core network element 14. In the illustrated embodiment, memory 116 includes a plurality of look-up tables for use in processing and/or routing signals received at core network element 14. Throughout this document, the term "table" refers to any data structure, compilation, or arrangement of information operable to facilitate storage, retrieval, and/or manipulation of that information. In the illustrated embodiment, memory 116 includes a node identification (Node ID) look-up table 118. Node ID look-up table 118 includes information, such as, network addresses for some or all of core network elements 14 in core cloud 12.

In this embodiment, memory 116 also includes an interface identification (I/F ID) look-up table 120. Interface ID look-up table 120 may include, for example, information specifying addresses of interfaces facilitating communication between a core network element 14 and various peripheral network elements 18–24.

The illustrated embodiment of memory 116 also includes a path identification (Path ID) look-up table 122. Path ID look-up table 122 may include, for example, information to facilitate connection oriented routing of, for example, MPLS signals over a specified path to a particular destination network element. In a particular embodiment, path ID look-up table 122 may include information facilitating creation of virtual paths and virtual channels for communication of asynchronous transport mode (ATM), Frame Relay, or packet-over-SONET signals through core cloud 12.

Although look-up tables 118–122 are depicted as separate data structures, one or more of those or other data structures could be combined without departing from the scope of the invention. In addition, other data structures containing various other information could reside within memory 116.

The content and functionality of each core network element 14 may vary depending on that network element's position within core cloud 12 and/or relationship to other network elements. For example, if core network element 14 is coupled to a peripheral network element 18–24, that core network element 14 is likely to include interface look-up tables specifying connection information to various peripheral network elements 18–24.

In addition, whether peripheral network element 18–24 carries connectionless or connection oriented traffic may effect the content and functionality of the core network element 14 coupled thereto. For example, an intermediate core network element, such as core network element 14*n* (which couples other core network elements, but not peripheral network elements) typically includes information identifying the topology of core cloud 12, such as Node ID look-up table 118. Where core network element 14 traffics connection oriented signals, memory 116 can also include path identifier look-up table 122. Core network elements 14 may include any combination of these and/or other look-up tables or other data structures, depending on the signals they process and/or the level of processing provided.

Following is an example of various functionality offered by various network elements. Assume a connectionless signal originates at interface equipment 42*a* and is destined for interface equipment 48*a*. Interface equipment 42*a* originates, for example, an Internet Protocol (IP) signal, specifying a network address of destination interface equipment 48*a*. Interface equipment 42*a* communicates the IP signal, including an identification of the network address for interface equipment 48*a*, across network 34 to router 20. Router 20 communicates the signal across communication link 30*d* to core network element 14*d*, the ingress core network element in this case.

Ingress core network element 14*d* receives the incoming signal from router 20 at peripheral interface 112. Peripheral interface 112 and/or processor 114 examines the incoming signal to determine whether the incoming signal is a connection oriented signal or a connectionless signal, or to determine what type of signaling the signal will experience as it traverses core cloud 12. In this case, the incoming signal is a connectionless IP signal specifying a network address for interface equipment 48*a*, which is coupled to router 24 through network 38, and further coupled to core network element 14*a* through communication link 30*a*. In this example, core network element 14*a* is an egress core network element for this signal.

Processor 114 appends a transport label to the incoming IP signal, which will direct other core network elements 14 encountering this signal as to how to process this signal. In particular, processor 114 of ingress core network element 14*d* may create transport label stack comprising a stack of sub-transport labels, each one of the sub-transport labels directing a particular core network element 14 to take a particular action. Each time an intermediate core network element 14 encounters the signal, the core network element 14 examines the sub-transport label on the top of the stack of transport labels and takes an action according to the content of the examined transport label. Once the action associated with the top sub-transport label is taken, that sub-transport label is popped from the stack, and the next sub-transport label is examined.

The signal is routed from ingress core network element 14*d* through core cloud 12 to egress core network element 14*a* in accordance with information specified in the transport label stack appended to the signal. Once the signal reaches egress core network element 14*a*, processor 114 of egress core network element 14*a* removes the remaining transport label stack from the signal, and communicates the signal to router 24 through peripheral interface 112. Router 24 may then take appropriate steps to route the signal to its intended destination, in this case, interface equipment 48*a*.

Figure 3A:
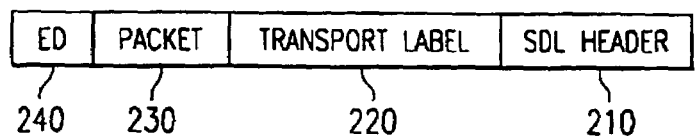
FIG. 3A is a block diagram of at least a portion of one exemplary embodiment of a signal format constructed according to the teachings of the present invention.

FIG. 3A is a block diagram showing exemplary content of a signal 200 for transmission through core cloud 12. In this example, signal 200 includes a signaling data link (SDL) header 210, a transport label 220, a packet area 230, and error detection (ED) information 240.

Signaling data link header information 210 is used to for packet delineation purposes. Signaling data link header 210 may include, for example, an indication of the packet length, an amount of padding added to the packet so that the packet ends on a convenient bit boundary, and Header Error Correction (HEC) information.

Transport label 220 includes an indication of the type of signal being transported, as well as information used in processing the signal during transport. Additional details regarding an exemplary embodiment of transport label 220 will be described below with reference to FIG. 3B.

Packet area 230 includes protocol information, such as Point-to-Point Protocol (PPP) bits from the original packet header received at ingress core network element 14, and packet bytes copied from the original packet. Packet area 230 may also include padding bytes added to the packet so that the packet ends on a convenient bit boundary, such as a 64-bit boundary.

Error detection information 240 may include various information useful in confirming the integrity of packet area 230 after its transport through one or more core network elements 14. In a particular embodiment, error direction information 240 may comprise, for example, Cyclic Redundancy Check (CRC)-32 information. Other error correction algorithms could be used consistent with the present invention.

Figure 3B:
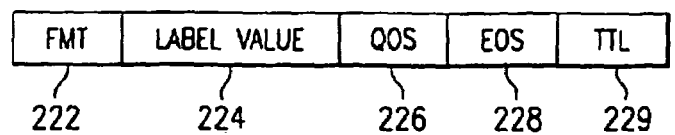
FIG. 3B is a block diagram of one exemplary embodiment of a transport label constructed according to the teachings of the present invention.

FIG. 3B is a block diagram of exemplary content of transport label 220. In the illustrated embodiment, transport label 220 includes format bits (FMT) 222, a label value 224, quality of service bits (QoS) 226, an end of stack (EOS) indicator 228, and time-to-live (TTL) information 229. In this embodiment, format information 222 includes a series of bits indicating the type of signal being transmitted. In this case, format information 222 comprises an index to a look up table 300 (which will be described with reference to FIG. 4 below). The information in look up table 300 tells the analyzing core network element 14 what type of signal is being transmitted, and may also include procedures for transmitting that signal.

Information within label value field 224 can vary depending on the type of signal being transmitted. Where, for example, signal 200 comprises an IP packet—a connectionless signal—label value field 224 may include a destination network address. Network elements 14 receiving that signal 200 can use the node address contained in label value field 224 to route signal 200 to the next hop. In other cases, where, for example, signal 200 comprises a connection oriented signal such as an MPLS signal with ATM, Frame Relay, or packet-over-SONET encoding, label value field 224 may include a path identifier. The path identifier could be used to access look up tables to establish, for example, virtual channels and virtual paths for routing connection oriented signal 200. In a particular embodiment, system 10 may receive an MPLS label at the ingress core network element 14, and simply append a format field to the existing MPLS label without further alteration. In that case, the network elements 14 within core cloud 12 process the MPLS label as they would with any other MPLS signal.

Quality of service information 226 may include various information specifying, for example, a priority associated with the particular signal relative to other signals being transmitted by system 10. As a particular example, quality of service information 226 may comprise 3 bits operable to specify one of a variety of transmission priorities.

End of stack indicator 228, in this embodiment, comprises a single bit indicating whether the current transport label is the last transport label associated with this signal 200. In some cases, ingress core network element 14 may generate multiple sub transport labels each associated with the same signal 200. In that case, each sub transport label 220 provides instruction for one or more particular core network elements 14 along the path through core cloud 12 to the destination network element. As core network elements 14 process signal 200 according to each sub transport label, those sub transport labels can be removed from the stack of sub transport labels accompanying that signal 200. The stack of sub transport labels can be designed so that the final sub transport label in the stack directs an egress core network element 14 in its transmission of signal 200 to an associated peripheral network element 18–24. In the illustrated embodiment, end of stack indicator 228 identifies a condition where the current sub transport label is the last sub transport label associated with signal 200.

Time-to-live field 229 includes information designed to avoid endless looping of information within core cloud 12, and may also be used to limit the scope of a broadcast packet. In a particular embodiment, time-to-live information 229 carries a particular value, which is decremented by one each time a packet passes through one of core network elements 14. If time-to-live value 229 reaches 0 before the packet has reached its destination, the packet can be discarded. Other methods of implementing the concept of a time-to-live variable can be used without departing from the scope of this invention.

Figures 4, 6A:
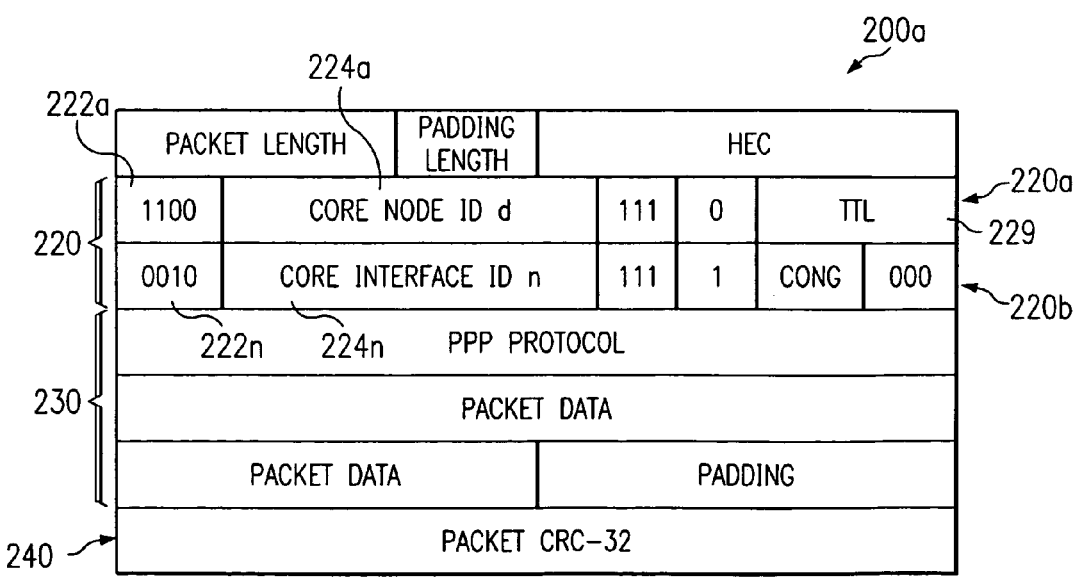
FIG. 4 is a block diagram of an exemplary format look-up table constructed according to the teachings of the present invention.
FIGS. 6A–6E are block diagrams of exemplary portions of signals communicated using the system shown in FIG. 1.

FIG. 4 is a block diagram of an exemplary format look-up table 300. Format look-up table 300 comprises a format index column 310 and an instruction column 312. In the illustrated embodiment, format index column 310 comprises a four bit indicator. Other content and/or format of signal format indicators could be used without departing from the scope of the invention. Core network elements 14 may include a format look-up table such as format look-up table 300 for use in determining what action to take on signals received. In other embodiments, all or a portion of the content of format look-up table 300 could be programmed and/or hard wired into one or more core network elements 14 to facilitate particular processing functions upon recognition of particular information in the format bits 222 of transport labels 220.

In this embodiment, format look-up table 300 includes several "reserved" entries. The functions associated with those entries can be determined, for example, by a network administrator. Other entries 310 are used to specify information associated with a particular type of signal or signal processing. For example, entry 310*a* (0000) indicates an MPLS label. Network elements receiving format field 310*a* will process the information in label value field 224 as an MPLS label. For example, in that case the information in label value field 224 may comprise a path identifier. Core network element 14 analyzing this signal can use the MPLS label in label value field 224 to access path ID look-up table 122 to facilitate generation of a virtual circuit and/or virtual path for this signal.

Entry 310b (0001) indicates that the signal has been designated as a multicast signal. In that case, label value field 224 of that signal will include information facilitating creation of virtual circuits and/or virtual paths to all applicable destination core network elements 14.

Entry 310c (0010) instructs core network element 14 to read the associated label value 224 as an interface identifier specifying a particular interface within an egress core network element 14 to a particular peripheral network element 18–24. The egress core network element 14 receiving this signal can use the value in label-value field 224 to access interface ID look-up table 120 to determine the appropriate interface for that signal. In this example, entry 310c indicates that the associated label value field 224 holds a 32-bit value. Entry 310d (0011) indicates the same information as entry 310c, but in this case associated label value 224 is a 64 bit entry, carrying the interface ID and information regarding the source of the signal. This source information can be useful, for example, for signal control purposes.

Entry 310p instructs core network element 14 to read the associated label value 224 as a node identifier specifying the address of a particular core network element 14. The core network element 14 receiving this signal can use the value in label-value field 224 to access node ID look-up table 118 to determine the next hop for the signal. This type of label value is typically used for transmitting signals in connectionless mode.

Figure 5:
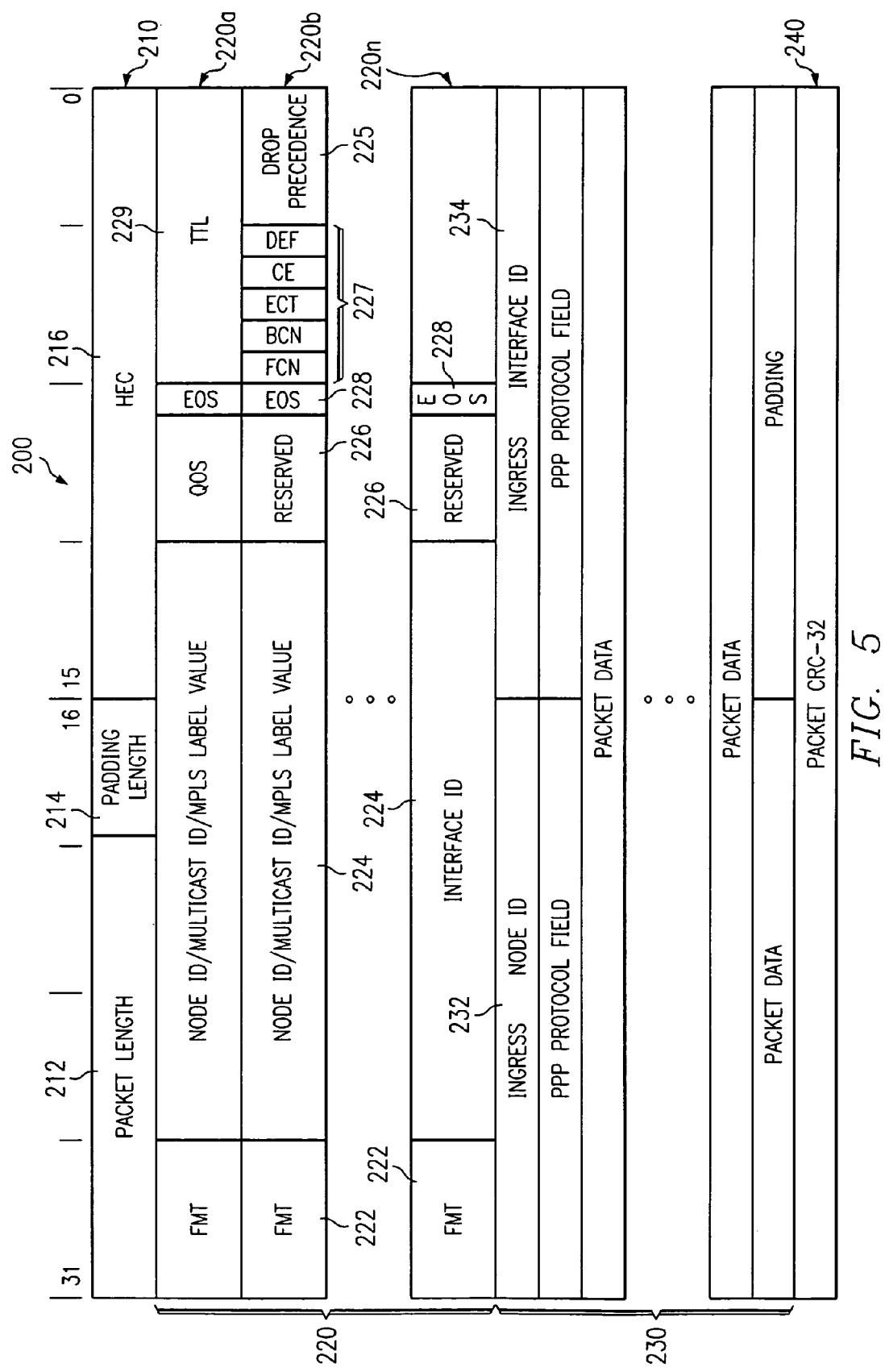
FIG. 5 is a block diagram of an exemplary signal format constructed according to the teachings of the present invention.

FIG. 5 is a block diagram showing an exemplary signal format of signal 200 constructed according to the teachings of the present invention. As discussed with respect to FIG. 3A, signal 200 may include SDL header 210, transport label 220, packet area 230, and packet error detection 240. In this particular example, SDL header 210 comprises 32 bits. The first 13 bits of SDL header 210 comprise an indication of packet length 212, in this case, the number of 32-bit words in the packet. The next 3 bits of SDL header 210 are an indication of a padding length 214. Padding length 214 indicates a number of bits used as padding for the packet data to ensure that the packet area ends on a convenient bit-boundary, for example, a 64-bit boundary. The final 16 bits of SDL header 210 comprise header error correction (HEC) bits 216. The header error correction information comprises Cyclic Redundancy Check (CRC)-16 information generated over the SDL packet length and padding length fields.

The specific content and format of the information described in SDL header 210 is for exemplary purposes only. Other content and formats could be used without departing from the scope of the invention.

In the illustrated embodiment, transport label 220 of signal 200 comprises a stack of sub-transport labels 220a–220n. As described with respect to FIG. 3B, each transport label 220a–220n includes format bits 222, label values 224, a quality of service field 226, and an end of stack indicator 228. In the illustrated embodiment, first sub-transport label 220a includes time-to-live field 229. In this embodiment, second sub-transport label 220b includes congestion information 227. Congestion information 227 may include, for example, a Forward Congestion Notification (FCN), a Backward Congestion Notification (BCN), and a Congestion Experienced indicator (CE), all of which denote that congestion has been experienced by the network. Congestion information 227 may also include an Explicit Congestion Notification Capable Transport indicator (ECT), which denotes that the flow is capable of responding to the congestion experienced indicators. Finally, congestion information 227 may include a Deflectively Routed indicator (DEF), which notes that a packet has been deflected to an alternative path as a protection mechanism. Second sub-transport label 220b may also include a drop precedence 225, which defines the current packet's discard precedence relative to other packets being transmitted.

In the illustrated embodiment, congestion information 227 and drop precedence field 225 reside in the second sub-transport label of the stack of sub-transport labels 220. Each time a sub-transport label 220a–220n is removed from the stack, time-to-live information 229 is copied to the new top sub-transport label 220b–220n, and congestion information 227 and drop precedence information 225 are copied to the current second sub-transport label 220c–220n.

In the illustrated embodiment, each sub-transport label stack 220 will include at least two sub-transport labels 220a–220n. The top sub-transport label 220a will include an indication of the signal type or signal processing type for signal 200. This sub-transport label 220a will instruct core network elements 14 regarding signaling procedures associated with signal 200. As signal 200 traverses core cloud 12 and network elements execute instructions associated with the sub-transport labels 220a–n-1, the sub-transport labels associated with the executed instructions are removed from transport label stack 220. Core network element 14 then examines the next sub-transport label to receive further instructions on processing signal 200.

In this embodiment, the final sub-transport label 220n in the transport label stack 220 carries an index to interface ID look-up table 120. When the egress core network element 14 receives signal 200 and examines the last sub-transport label 220n, it uses the interface ID in label value field 224 to index its interface ID look-up table 122 and identify an interface between the egress core network element 14 and the destination peripheral network element 18–24. Egress core network element 14 then removes transport label 220n from signal 200 and routes the signal to the destination peripheral network element 18–24.

Packet area 230 contains information as described with respect to FIG. 3A. In addition, packet area 230 of FIG. 5 includes ingress node ID information 232 and ingress interface ID information 234, which can be used, for example, in various signal control operations.

In this embodiment, signal 200 also includes error detection information 240, as described in FIG. 3A.

Figure 6B:
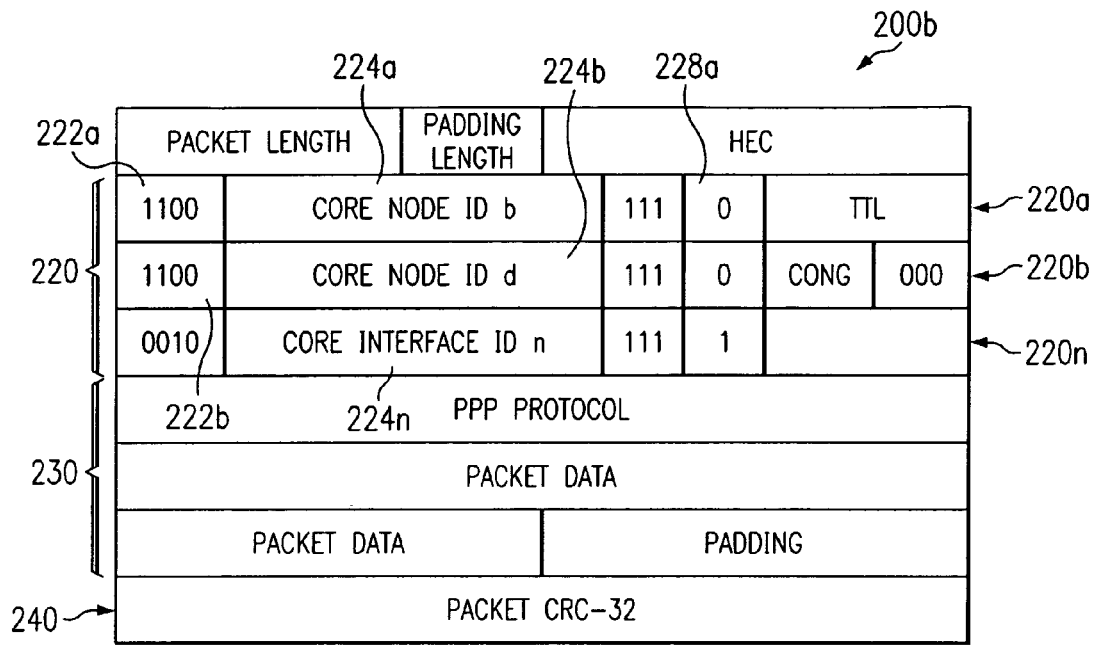
Figure 6C:
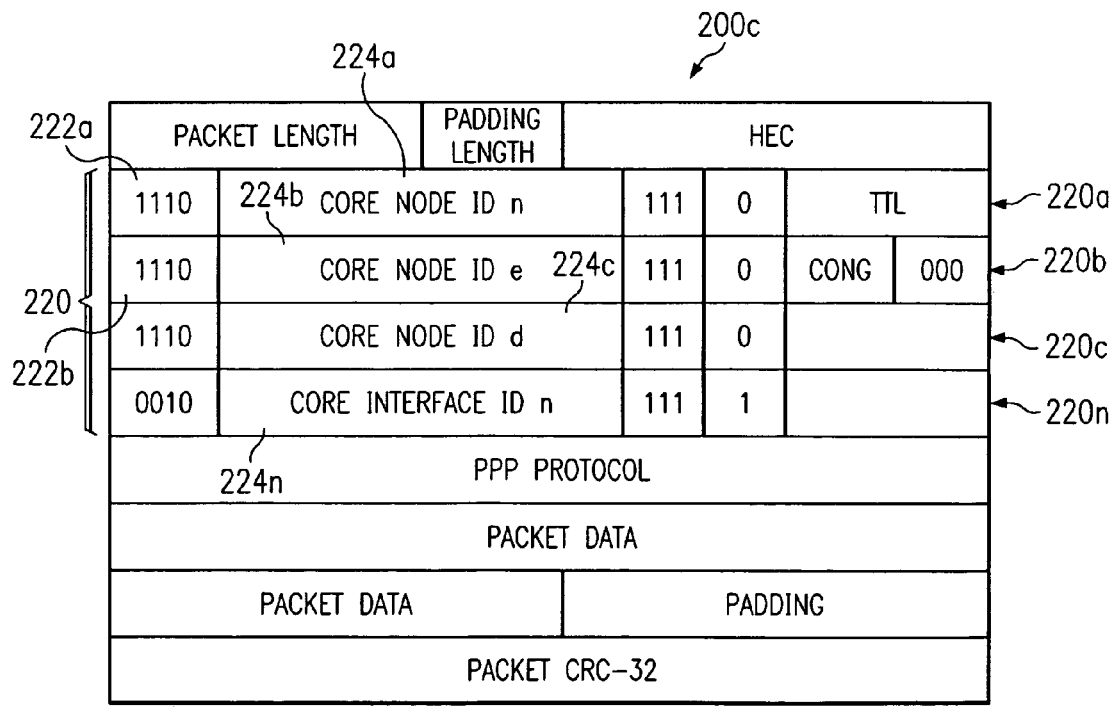

FIGS. 6A–6E are block diagrams of exemplary signals 200a–200e, and will be used to provide examples of signal processing within core cloud 12. FIGS. 6A–6C assume that an IP signal is received at core cloud 12 from router 24, that the signal is destined for router 20, and that the signal is to be communicated from router 24 to router 20 in a connectionless manner. In these examples, core network element 14a, which is coupled to router 24, serves as the ingress node within core cloud 12, and core network element 14d, which is coupled to router 20 serves as the egress core network element within core cloud 12.

FIG. 6A is an example of pure connectionless routing of a signal 200a from ingress core network element 14a to egress core network element 14d. Ingress core network element 14a may format the incoming packet to append transport label 220, or may receive a formatted packet including transport label 200 from another network element. Transport label 220, in this example, comprises a stack of sub-transport labels 220a and 220n. Sub-transport label 220a includes label value 224a comprising a node identification associated with egress core network element 14d. Sub-transport level 220n includes label value 224n comprising an identification of the interface ID for the interface between egress core network element 14d and router 20.

Based on a routing algorithm and the node ID in label value field 224a of sub-transport label 220a, ingress core network element 14a determines the next hop for signal 200a. For example, network element 14a may determine that the most appropriate next hop for signal 200a is core network element 14b. Core network element 14b receives signal 200a and examines the first sub-transport label 220a. In particular, core network element 14b examines format field 222a of sub-transport label 220a to determine that label value field 224a of transport label 220a represents a node ID. Core network element 14b compares its node ID to the node ID specified in label value field 224a. Finding no match, core network element 14b consults its node ID look-up table 118 to determine the appropriate next hop.

In this particular example, network element 14b may determine that the appropriate next hop is to network element 14c. Network element 14c receives signal 200a and, recognizing that the first sub-transport label 220a identifies a node ID, and that network element 14c's node ID does not match the node ID specified in label value field 224a, network element 14c determines the appropriate next hop for signal 200a. Using the node ID provided in label value 224a, network element 14c consults its node ID look-up table 118 to determine the next hop for signal 200a. In this case, network element 14c communicates signal 200a to egress network element 14d.

Egress core network element 14d receives signal 200a and examines the first sub-transport label 220a. Recognizing, from format field 222a, that label value 224a represents a node ID, egress core network element 14d compares its node ID to the node ID specified in label value 224a. Finding a match, egress core node 14d removes sub-transport label 220a from transport label stack 220 and examines the next sub-transport label 220n. In particular, egress core network element 14d examines format field 222n and determines that label value field 224n comprises an interface ID. Egress core network element 14d uses that interface ID to cross-reference its interface ID look-up table 120 and determine the appropriate interface for transmission of signal 200a to router 20. Egress core network element 14d next removes transport label 220 from signal 200a, and transmits the IP packet to the destination router 20.

FIG. 6B is a block diagram of a signal 200b formatted for transmission through core cloud 12 using loosely explicit routing. The term "loosely explicit routing" denotes a connectionless form of routing, which specifies one or more intermediate nodes between the ingress node and the egress node of core cloud 12. Following from the previous example, the ingress node in this case is network element 14a, while the egress node in this example is network element 14d. In the example shown in FIG. 6B, loosely explicit routing is used to specify that signal 200b should traverse through network element 14b on its way to its destination network element 14d. As a result, transport label stack 220 includes an additional sub-transport label 220b specifying transmission through network element 14b.

In operation, ingress core network element 14a compares the node ID specified in label value 224a, finds no match with its node ID, and consults its node ID look-up table 118 to determine the next hop for signal 200b on its way to network element 14b. In this case, network element 14a communicates signal 200b directly to network element 14b. Network element 14b receives signal 200b, examines format field 222a, and determines that label value field 224a specifies a node ID. Network element 14b compares its node identification with the node identification specified in label value field 224a and determines a match. Recognizing that the end of stack indicator 228a shows that additional sub-transport labels remain, network element 14b pops sub-transport 220a from transport label stack 220 and continues by examining sub-transport label 220b. Examining format field 222b of sub-transport label 220b, network element 14b recognizes label value field 224b as a node ID. After confirming that the node ID specified in label value field 224b does not match the node ID for network element 14b, network element 14b consults its node ID look-up table 118 to determine the next hop for signal 200b on its way to network element 14d. In this example, network element 14c is identified as the next hop for signal 200b. Network element 14c receives signal 200b and examines the first sub-transport label in transport label stack 220, in this case sub-transport label 220b. Network element 14c ultimately routes signal 200b to egress network element 14d, where signal 200b is routed through the appropriate interface to router 20 in a manner similar to that described with respect to FIG. 6A.

FIG. 6C provides an example of a method of explicit routing of a signal through core cloud 12. The term "explicit routing" refers to a routing algorithm where each node that will be traversed by the signal through core cloud 12 from the ingress node to the egress node is explicitly specified. To this end, transport label stack 220 comprises a stack of sub-transport labels, each identifying a node ID of a network element 14 in a sequential path between the ingress node and egress node. The final sub-transport label 220n in transport label stack 220 identifies an interface between the egress network element 14 and the destination peripheral network element, in this case, router 20.

The example shown in FIG. 6C assumes that signal 200c is to be transmitted from an ingress network element 14a to an egress network element 14d, by way of intermediate network elements 14n and 14e, sequentially. In operation, ingress network element 14a consults its node ID look-up table 118 to determine an appropriate hop to network element 14n specified in sub-transport label 220a. Network element 14n receives signal 200c and examines format field 222a to determine that label value field 224a is a node ID. Network element 14n compares its node ID to the node ID specified in label value field 224a, and determines a match. Network element 14n then pops the top sub-transport label 220a, and examines the next sub-transport label 220b. Network element 14n determines that label value 224b identifies a node ID, and compares its Node ID to that one. Finding no match, network element 14n uses the node ID in label value 224b to index its node ID look-up table 118 and determine a next hop for signal 200c, in this case, core network element 14e.

Core network element 14e receives signal 200c, examines format field 222b to determine that label value field 224b contains a node ID, and compares its node ID to the value in label value field 224b. Finding a match, core network element 14e pops sub-transport label 220b and examines sub transport label 220c. Network element 14e determines that label value 224c identifies a node ID, and compares its Node ID to that one. Finding no match, network element 14e uses the node ID in label value 224c to index its node ID look-up table 118 and determine a next hop for signal 200c, in this case, core network element 14d.

When signal 200c arrives at egress core network element 14d, the process continues similarly to that described with respect to FIG. 6A.

Figure 6D:
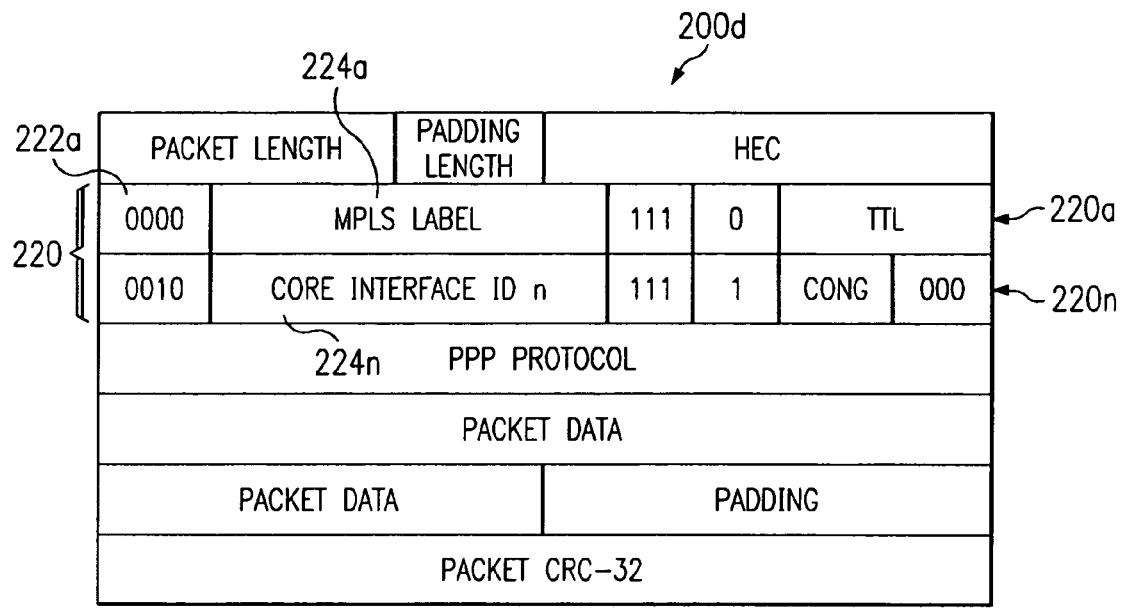

FIG. 6D shows a block diagram of a signal 200d, which contains information associated with a connection oriented signal. This example assumes that interface equipment 40a desires to communicate an MPLS signal with ATM encoding to interface equipment 44a. In this example, core network element 14b coupled to label switching router 18 is an ingress node, and core network element 14e coupled to label switching router 22 is an egress node on core cloud 12. The example assumes that signal 200d is to be routed through core cloud 12 using MPLS routing.

Ingress core network element 14b creates, or receives signal 200d with transport label stack 220. In this example, transport label stack 220 includes sub-transport label 220a, which specifies in label value 224a a path identifier associated with signal 200d. Transport label stack 220 also includes label value 224n, which specifies an interface address between egress core network element 14e and label switching router 22. Ingress core network element examines format field 222a of signal 200d, and determines that label value 224a specifies a path ID. Using the MPLS label in label value field 224a to index its path ID look-up table 122, ingress core network element 14b establishes virtual circuits and/or virtual paths for communicating signal 200d to egress core network element 14e.

Egress core network element 14e receives signal 200d, pops the top sub-transport label 220a, and examines sub-transport label 220n to identify the interface linking that core network element 14e and label switching router 22. Core network element 14e restores signal 200d to its original format, and communicates signal 200d to label switching router 22 for further processing.

Figure 6E:
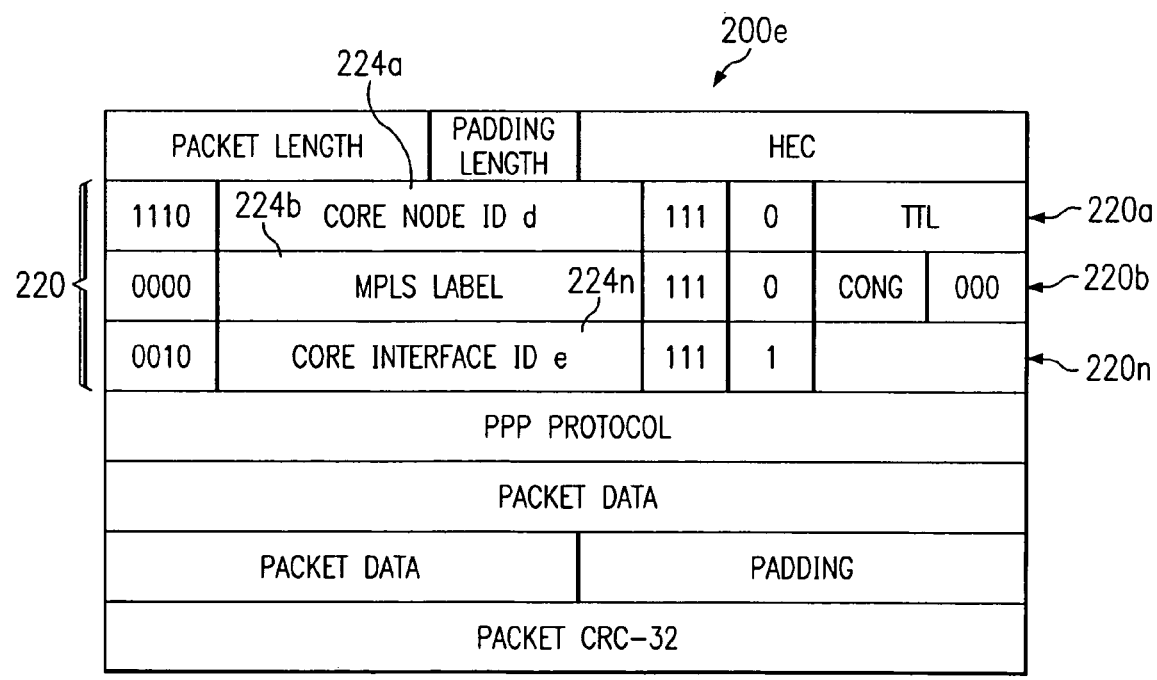

FIG. 6E is a block diagram of a signal 200e, which will be routed through core cloud 12 using both connectionless and connection oriented signaling. This example assumes a signal is received from label switching router 18, and is to be communicated through core cloud 12 to label switching router 22. This example also assumes that the signal is intended to be transmitted through core cloud 12 in a connectionless manner until it reaches core network element 14d, and then transmitted to egress core network element 14e using a connection oriented process. This type of signal routing could be desirable, for example, where particular regions of core cloud 12 require traffic engineering capabilities due to their relative congestion compared to other areas of core cloud 12.

To accomplish this hybrid routing process, system 10 generates transport label 220, which includes sub-transport label 220a—specifying a node ID for connectionless signaling to core network element 14d; and sub-transport label 220b—specifying a path ID from core network element 14d to egress core network element 14e to facilitate connection oriented signaling during that part of the signal path.

In this example, ingress core network element 14b generates or receives transport label stack 220 associated with signal 200e. Network element 14b examines sub-transport label 220a and determines that transport value 224a comprises a node ID that does not match the node ID for ingress core network element 14b. Using transport value 224a to index its node ID look-up table 118, core network element 14b identifies the next hop for signal 200d.

This connectionless signaling method continues as described above with respect to FIGS. 6A–6C, until signal 200d reaches core network element 14d. At that point core network element finds a match between its node ID and the node ID specified in label value field 224a, removes sub-transport label 220a, and examines the next sub-transport label 220b. Finding that label value 224b includes a path ID, core network element 14d uses the label value 224b to index its path ID look-up table, and facilitates connection oriented signaling of signal 200d from core network element 14d to core network element 14e. At core network element 14e, sub-transport label 220b is popped, and sub-transport label 220n is used to communicate the packet within signal 200d to an interface linking egress core network element 14e and label switching router 22.

Figure 7:
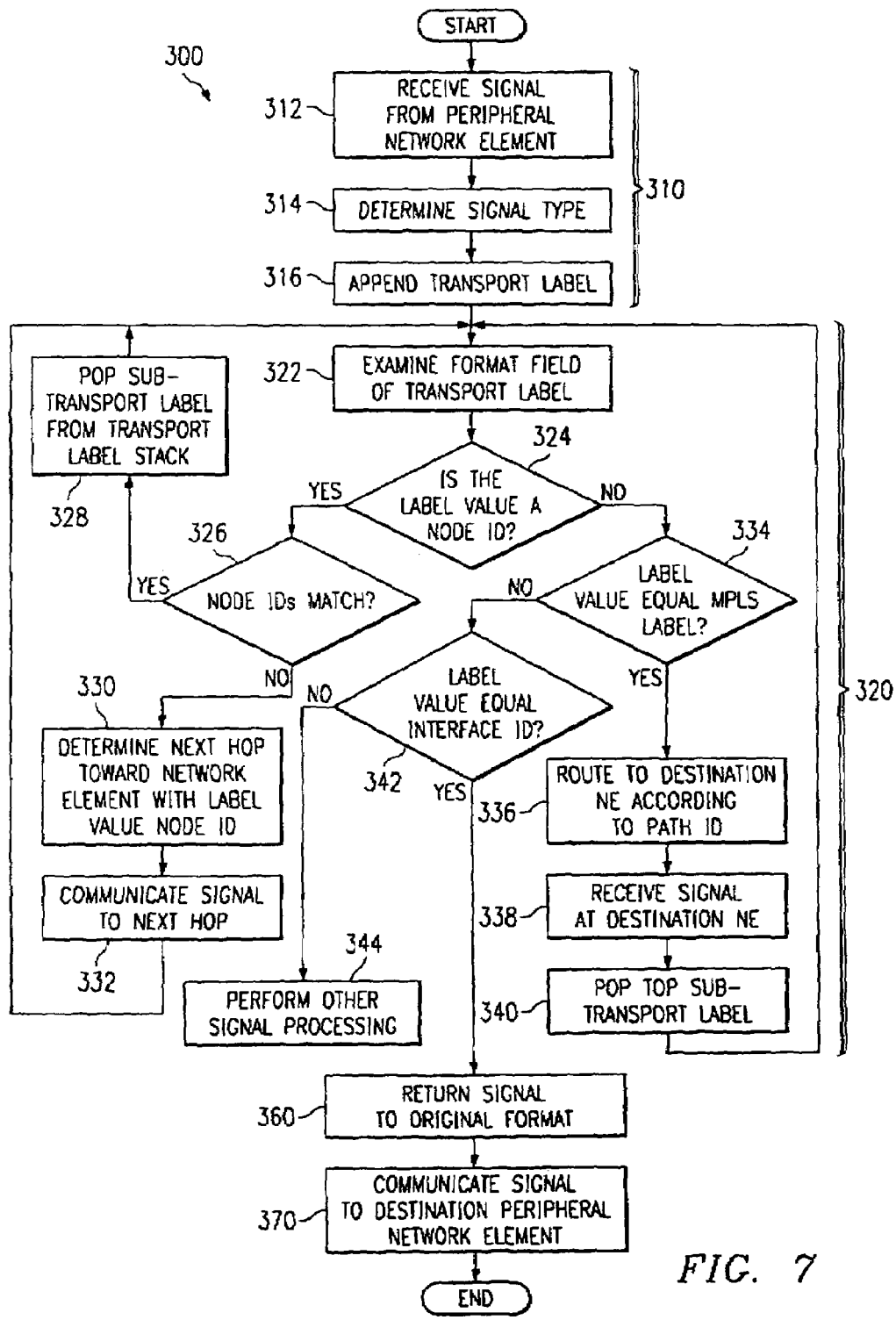
FIG. 7 is a flow chart showing an exemplary method of communicating connectionless and connection oriented signals over common network elements.

FIG. 7 is a flow chart showing an exemplary method 300 of communicating connectionless and connection oriented signals over common network elements. The method 300 begins at step 310 where core cloud 12 receives a signal from a peripheral network element 18–24, and formats the signal for transport through core cloud 12. Method 310 may include receiving a connectionless signal, a connection oriented signal, or a signal requiring both connectionless and connection oriented processing at step 312. The ingress core network element 14 receiving the signal from peripheral network elements 18–24 determines at step 314 the signal type or the type of routing associated with that signal. Ingress core network element 14 appends transport label 220 to the signal at step 316. Ingress core network element 14 may generate transport label 220, or may receive the transport label from another network element. In a particular embodiment, transport label 220 comprises a stack of sub-transport labels, each sub-transport label specifying a routing instruction for all or a portion of the signal's path through a core cloud 12.

The method continues at step 320 where system 10 transports formatted signal 200 through core cloud 12 to an egress core network element 14. Details regarding an exemplary method of transporting signal 200 through core cloud 12 will be described below. Egress core network element 14 receives formatted signal 200 and returns formatted signal 200 to its original format at step 360. In a particular embodiment, egress core network element 14 returns signal 200 to its original format by removing transport label 220 from signal 200. Egress core network element 14 communicates the original signal to the destination peripheral network element 18–24 for at step 370.

The following description provides additional details on an exemplary method 320 of transporting signal 200 through core cloud 212. The method 320 begins at step 322 where core network element 14 receiving the formatted signal examines format field 222 of transport label 220. If core network element 14 determines at step 324 that label value 224 comprises a node ID, core network element 14 determines at step 326 whether its node ID matches the node ID specified in label value field 224. If the node IDs match, core network element 14 pops the top sub-transport label 220a from transport label stack 220 at step 328, and examines the next sub-transport label 220b at step 322.

If format field 222 identifies label value 224 as a node ID at step 324, and core network element 14 determines at step 326 that its node ID does not match the node ID specified in label value field 224, core network element 14 determines at step 330 the next hop for signal 200. Determining the next hop for signal 200 may involve, for example, using the node ID specified in label value field 224 as an index to node ID look-up table 118, and applying a routing algorithm accordingly. Once core network element 14 determines the next hop for signal 200, it communicates signal 200 to the next core network element 14 at step 332.

After examining format field 222 of transport label 220 at step 322, core network element 14 may determine at step 334 that label value 224 is an MPLS label containing, for example, a path identifier. In that case, core network element 14 uses label value 224 to access, for example, path ID look-up table 122 to facilitate generation of virtual paths and/or virtual circuits for connection oriented communication of signal 200. In some cases, label value 224 may comprise a multi-cast label. In those situations, core network element 14 may generate virtual circuits and/or virtual paths for each destination core network element at step 336. Destination core network element 14 receives signal 200 at step 338, and may pop the top sub-transport label 220a–220n-1 at step 340. The destination core network element 14 then examines format field 222 of the next sub-transport label at step 322.

Various signals may use some or all of steps 322–340 described above. Some signals may use purely connectionless signaling, some may use only connection oriented signaling, and others may use a combination of connectionless and connection oriented signaling.

When core network element 14 examines format field 222 of transport label 220 at step 322 and determines at step 342 that label value 224 of the current sub-transport label comprises an interface ID, core network element 14 determines the correct interface between it and the destination peripheral network element 18–24. For example, egress network element 14 may use the interface ID as an index to interface ID look-up table 120 to identify the correct interface between that core network element 14 and the destination peripheral network element 18–24. Egress core network element 14 returns signal 200 to its original format at step 360 and communicates the original signal to the destination peripheral network element 18–24 at step 370.

At any time during the signaling process, core network element 14 may examine format field 222 of transport label 220 and determine that label value 224 does not specify a node ID, a path ID, or an interface ID Rather, in those cases, label value may specify a particular processing function that may be defined, for example, by a network administrator. In those cases, core network element 14 performs the specified signal processing functions at step 344.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A method of communicating connectionless and connection oriented signals using at least one common network element, comprising:
   receiving connectionless and connection oriented signals from a plurality of source peripheral network elements at an ingress core network element;
   determining a signaling type associated with each received signal, the signaling type comprising connectionless signaling or connection oriented signaling;
   appending a transport label to each received signal at the ingress core network element based upon the determination of the signaling type, each transport label comprising:
      an indication of the signal's signaling type;
      a plurality of sub-transport labels, each sub-transport label identifying a single hop of a plurality of hops between the ingress core network element and an egress core network element for a connectionless signal or identifying a single path segment of a plurality of path segments between the ingress core network element and the egress core network element for a connection oriented signal, wherein the plurality of sub-transport labels comprise a stack of sub-transport labels, the top sub-transport label identifies the node identification useful in determining the next hop or the next path identification, and the bottom sub-transport label includes an interface identifier operable to specify the interface of the egress core network element between the ingress core network element processing the signal and the one or more destination peripheral network elements; and
   communicating the signals and appended transport labels toward destination peripheral network elements according to signaling procedures associated with each signal's signaling type.

2. The method of claim 1, wherein the signaling type associated with a particular signal further comprises a combination of connectionless and connection oriented signaling.

3. The method of claim 1, wherein at least some of the plurality of signals comprise Multi-protocol label switching signals, and wherein at least some of the plurality of signals comprise Internet Protocol signals.

4. The method of claim 3, wherein at least some of the plurality of signals comprise multi-protocol label switching signals with asynchronous transfer mode, Frame Relay, or packet-over-SONET encoding.

5. The method of claim 1, wherein each transport label comprises:
   a format field operable to identify the signal's signaling type; and
   a label value field containing information useful in processing the associated signal according to its signaling type.

6. The method of claim 1, wherein each sub-transport label provides an instruction regarding the associated signal's communication toward one of the destination peripheral network elements.

7. The method of claim 1, further comprising:
   receiving the signals and transport labels at the egress core network element;
   removing the appended transport labels from each signal; and
   communicating each signal to a destination peripheral network element.

8. A method of communicating connectionless and connection oriented signals using at least one common network element, comprising:
   receiving connectionless signals and connection oriented signals at a first network element comprising an ingress core network element, each signal including a transport label having a format field identifying a signaling type associated with the signal, a label value field containing information useful in processing the signal according to its signaling type, and a stack of sub-transport labels, each sub-transport label providing an instruction regarding the associated signal's communication toward one of the destination peripheral network elements, and wherein the top sub-transport label identifies a node identification useful in determining a next hop for a connectionless signal or a path identification useful in determining a virtual circuit for a connection oriented signal, and wherein the bottom sub-transport label includes an interface identifier operable to specify an interface of an egress core network element between the ingress core network element processing the signal and the destination peripheral network element;

for each signal, examining the format field of the transport label to determine the signal's signaling type;

for each signal, interpreting the information in the label value field of the transport label according to the signal type; and for each signal, communicating the signal to another network element using signaling procedures associated with the signal's signaling type.

9. The method of claim 8, wherein the signaling type associated with a particular signal further comprises a combination of connectionless and connection oriented signaling.

10. The method of claim 8, wherein determining the signal's signaling type and interpreting the information in the label value field of the transport label according to the signal type comprises:

examining the top sub-transport label to determine that the signal comprises a connectionless signal; and comparing the value in the label value field of the top sub-transport label to a node identification associated with the first network element.

11. The method of claim 10, further comprising:

determining that the node identification associated with the first network element does not match the value in the label value field of the transport label; and routing the signal toward the network element associated with the node identification in the label value field of the top sub-transport label.

12. The method of claim 10, further comprising:

determining that the node identification associated with the first network element matches the value in the label value field of the top sub-transport label;

removing the top sub-transport label from the stack of sub-transport labels; and examining the next sub-transport label to determine further processing instructions.

13. The method of claim 8, wherein determining the signal's signaling type and interpreting the information in the label value field of the transport label according to the signal type comprises:

examining the top sub-transport label to determine that the signal comprises a connection oriented signal and that the label-value field in the top sub-transport label comprises a path identifier; and using the value in the label value field of the top sub-transport label to at least begin establishing a virtual circuit between the first network element and another network element.

14. A communication system operable to communicate connectionless signals and connection oriented signals using at least one common network element, the system comprising:

a first core network element comprising an ingress core network element and operable to receive a signal associated with a signaling type from a source peripheral network element, the signaling type comprising connectionless signaling or connection oriented signaling, the first core network element further operable to append to the received signal a transport label including an instruction regarding how to process the signal according to its signaling type, the transport label including a plurality of sub-transport labels, each sub-transport label identifying a single hop of a plurality of hops between the ingress core network element and an egress core network element for a connectionless signal or identifying a single path segment of a plurality of path segments between the ingress core network element and the egress core network element for a connection oriented signal, wherein the plurality of sub-transport labels comprise a stack of sub-transport labels, the top sub-transport label identifies the node identification useful in determining the next hop or the next path identification, and the bottom sub-transport label includes an interface identifier operable to specify the interface of the egress core network element between the ingress core network element processing the signal and the one or more destination peripheral network elements; and a second core network element operable to receive the signal with appended transport label, to examine the transport label to determine the signaling type associated with the signal, and to process the signal according to the associated signaling type.

15. The system of claim 14, wherein the transport label comprises:

a format field operable to identify the signal's signaling type; and a label value field containing information useful in processing the associated signal according to its signaling type.

16. The system of claim 14, wherein the second core network element comprises a processor operable to:

examine the top sub-transport label to determine that the signal comprises a connectionless signal; and compare the node identification in the top sub-transport label to a node identification associated with the first network element.

17. The system of claim 16, wherein the processor is further operable to determine that the node identification associated with the first network element does not match the node identification in the transport label; and wherein the second core network element comprises a core interface operable to route the signal toward the network element associated with the node identification identified in the top sub-transport label.

18. The system of claim 16, wherein the processor is further operable to determine that the node identification associated with the first network element matches the node identification in the transport label, to remove the top sub-transport label from the stack of sub-transport labels, and to examine the next sub-transport label to determine further processing instructions.

19. The system of claim 14, wherein the second core network element comprises a processor operable to:

examine the top sub-transport label to determine that the signal comprises a connection oriented signal and that the label-value field in the top sub-transport label comprises a path identifier; and use the value in the label value field of the top sub-transport label to at least begin establishing a virtual circuit between the first network element and another network element.

20. The system of claim 14, wherein the egress core network element is operable to remove the appended transport label and communicate the signal to a destination peripheral network element.

21. An ingress core network element operable to facilitate communication of signals associated with various signaling types received from a first peripheral network element to a second peripheral network element, the ingress core network element comprising:

a processor operable to receive a network signal from the first peripheral network element and to determine a signaling type associated with the received network signal, the processor further operable to generate a transport label including an instruction regarding how to process the signal according to its signaling type, and to append the transport label to the network signal based upon the determination of the signaling type to generate a formatted network signal, the transport label including a plurality of sub-transport labels, each sub-transport label identifying a single hop of a plurality of hops between the ingress core network element and an egress core network element for a connectionless signal or identifying a single path segment of a plurality of path segments between the ingress core network element and the egress core network element for a connection oriented signal, wherein the plurality of sub-transport labels comprise a stack of sub-transport labels, the top sub-transport label identifies the node identification useful in determining the next hop or the next path identification, and the bottom sub-transport label includes an interface identifier operable to specify the interface of the egress core network element between the ingress core network element processing the signal and the one or more destination peripheral network elements; and a core interface operable to receive the formatted network signal and to facilitate communication of the formatted network signal to another core network element for processing according to the next one of the plurality of sub-transport labels.

22. The core network element of claim 21, wherein the transport label comprises:

a format field operable to identify the signal's signaling type; and a label value field containing information useful in processing the associated signal according to its signaling type.

23. The core network element of claim 21, wherein the processor is operable to:

examine the top sub-transport label to determine that the signal comprises a connectionless signal; and compare the node identification in the top sub-transport label to a node identification associated with the core network element.

24. The core network element of claim 23, wherein the processor is further operable to determine that the node identification associated with the core network element does not match the node identification in the transport label; and wherein the second core network element comprises a core interface operable to route the signal toward the network element associated with the node identification identified in the top sub-transport label.

25. The core network element of claim 23, wherein the processor is further operable to determine that the node identification associated with the core network element matches the node identification in the transport label, to remove the top sub-transport label from the stack of sub-transport labels, and to examine the next sub-transport label to determine further processing instructions.

26. The core network element of claim 21, wherein the processor is operable to:

examine the top sub-transport label to determine that the signal comprises a connection oriented signal and that the label-value field in the top sub-transport label comprises a path identifier; and use the value in the label value field of the top sub-transport label to at least begin establishing a virtual circuit between the core network element and another network element.

27. The core network element of claim 21, further comprising a peripheral interface operable to receive the network signal from the first peripheral network element, and to communicate network signals received from the core network element to the second peripheral network element.

* * * * *

UNITED STATES PATENT AND TRADEMARK OFFICE
CERTIFICATE OF CORRECTION

PATENT NO. : 7,151,773 B1  
APPLICATION NO. : 09/588632  
DATED : December 19, 2006  
INVENTOR(S) : Li Mo et al.

Page 1 of 1

It is certified that error appears in the above-identified patent and that said Letters Patent is hereby corrected as shown below:

Title Page 2, Other Publications, Right Column, Line 52, insert -- International Preliminary Examination Report in International Application No. PCT/US01/13732, dated July 12, 2002, 5 pages. --.
Column 5, Line 25, after "(ASIC)" insert -- . --.

Signed and Sealed this

Twenty-eighth Day of April, 2009

JOHN DOLL  
*Acting Director of the United States Patent and Trademark Office*